United States Patent [19]
Nabity

[11] Patent Number: 5,647,260
[45] Date of Patent: Jul. 15, 1997

[54] ROLLER CUTTING MACHINE

[76] Inventor: Stephen W. Nabity, P.O. Box 1053, Fremont, Nebr. 68025

[21] Appl. No.: 536,801

[22] Filed: Sep. 29, 1995

[51] Int. Cl.⁶ .................. B26D 7/27; B26D 5/14
[52] U.S. Cl. .............. 83/522.12; 83/566; 83/860; 83/DIG. 1
[58] Field of Search ............... 83/DIG. 1, 522.12, 83/284, 566, 860; 72/207; 68/264; 492/53, 54, 55, 56, 48

[56] References Cited

U.S. PATENT DOCUMENTS

| | | | |
|---|---|---|---|
| 1,126,982 | 2/1915 | Goss | 72/207 |
| 1,136,387 | 4/1915 | Young et al. | 68/264 |
| 1,925,364 | 9/1933 | Ault | 68/264 |
| 2,088,686 | 8/1937 | Blanchard, Jr. | 83/284 |
| 3,490,261 | 1/1970 | Izett | 72/207 |
| 3,926,081 | 12/1975 | Roberts | 83/522.12 |
| 4,070,940 | 1/1978 | McDaniel et al. | 83/DIG. 1 |
| 4,092,890 | 6/1978 | Bousquet | 83/284 |
| 4,514,998 | 5/1985 | Jury | 72/207 |
| 4,528,488 | 7/1985 | Susemihl | 83/DIG. 1 |
| 4,860,622 | 8/1989 | Di Bernardo | 83/284 |

FOREIGN PATENT DOCUMENTS

| | | | |
|---|---|---|---|
| 610860 | 3/1935 | Germany | 83/284 |
| 767 | of 1871 | United Kingdom | 83/284 |

*Primary Examiner*—Kenneth E. Peterson
*Assistant Examiner*—Sean A. Pryor
*Attorney, Agent, or Firm*—Zarley, McKee, Thomte, Voorhees & Sease; Mark D. Frederiksen

[57] ABSTRACT

A roller die cutting machine includes a base having a drive roller assembly generally centered thereon between opposing side edges. A first table is located between the drive roller assembly and the first side edge to support a die assembly, and a second table is supported on the base opposite the first table to support a die assembly. A crank is connected through a set of gears to the pressure roller to rotate the pressure roller and to draw a die assembly through the drive roller assembly, to thereby cut stock positioned on the die assembly. A cover on the drive roller assembly includes a pair of inwardly projecting lips which will contact the pressure roller and produce an audible sound as a consumer's hand approaches the cutting location of the pressure roller.

5 Claims, 3 Drawing Sheets

ROLLER CUTTING MACHINE

TECHNICAL FIELD

The present invention relates generally to die cutting apparatus, and more particularly to an improved roller die cutting machine.

BACKGROUND OF THE INVENTION

Rotary dies and rotary die cutting apparatus have been utilized for many years for cutting shapes and patterns from continuous sheet stock material. Rotary die cutting machines are typically expensive pieces of equipment, and are also expensive to operate, and are therefore unsuitable for smaller tasks.

In order to fulfill a need by educational institutions and the home consumer, the inventor herein devised a pressure roller cutting machine which was simple to operate, economical to manufacture, and inexpensive for the purchaser. The roller die cutting machine included a plurality of parallel and spaced apart support rollers upon which a die plate was movably supported. A pressure roller mounted above the support rollers was rotatable to draw a die covered by a piece of paper or card stock between the pressure roller and the support rollers. As the pressure roller rotated the crown of the pressure roller would impart a force directly on the stock causing the blades of the die to cut through the stock.

While the roller die cutting machine has worked well for its intended purposes, the inventor herein has improved upon the machine with various safety features.

SUMMARY OF THE INVENTION

It is therefore a general object of the present invention to provide an improved roller die cutting machine.

Another object is to provide a roller cutting machine with an audible alarm to indicate the presence of a foreign object located near the cutting operation of the roller on the die.

A further object is to provide a roller die cutting machine with direct drive capabilities between the crank handle and the pressure roller.

Still another object of the present invention is to provide a roller die cutting machine which maintains uniform cutting pressure transversely along the die.

Still another object of the present invention is to provide a roller die cutting machine which is simple to operate, economical to manufacture, and refined in appearance.

These and other objects will be apparent to those skilled in the art.

The roller die cutting machine of the present invention includes a base having a drive roller assembly generally centered thereon between opposing side edges. A first table is located between the drive roller assembly and the first side edge to support a die assembly, and a second table is supported on the base opposite the first table to support a die assembly. A crank is connected through a set of gears to the pressure roller to rotate the pressure roller and to draw a die assembly through the drive roller assembly, to thereby cut stock positioned on the die assembly. A cover on the drive roller assembly includes a pair of inwardly projecting lips which will contact the pressure roller and produce an audible sound as a consumer's hand approaches the cutting location of the pressure roller.

DESCRIPTION OF THE PREFERRED EMBODIMENTS

Figure 1:
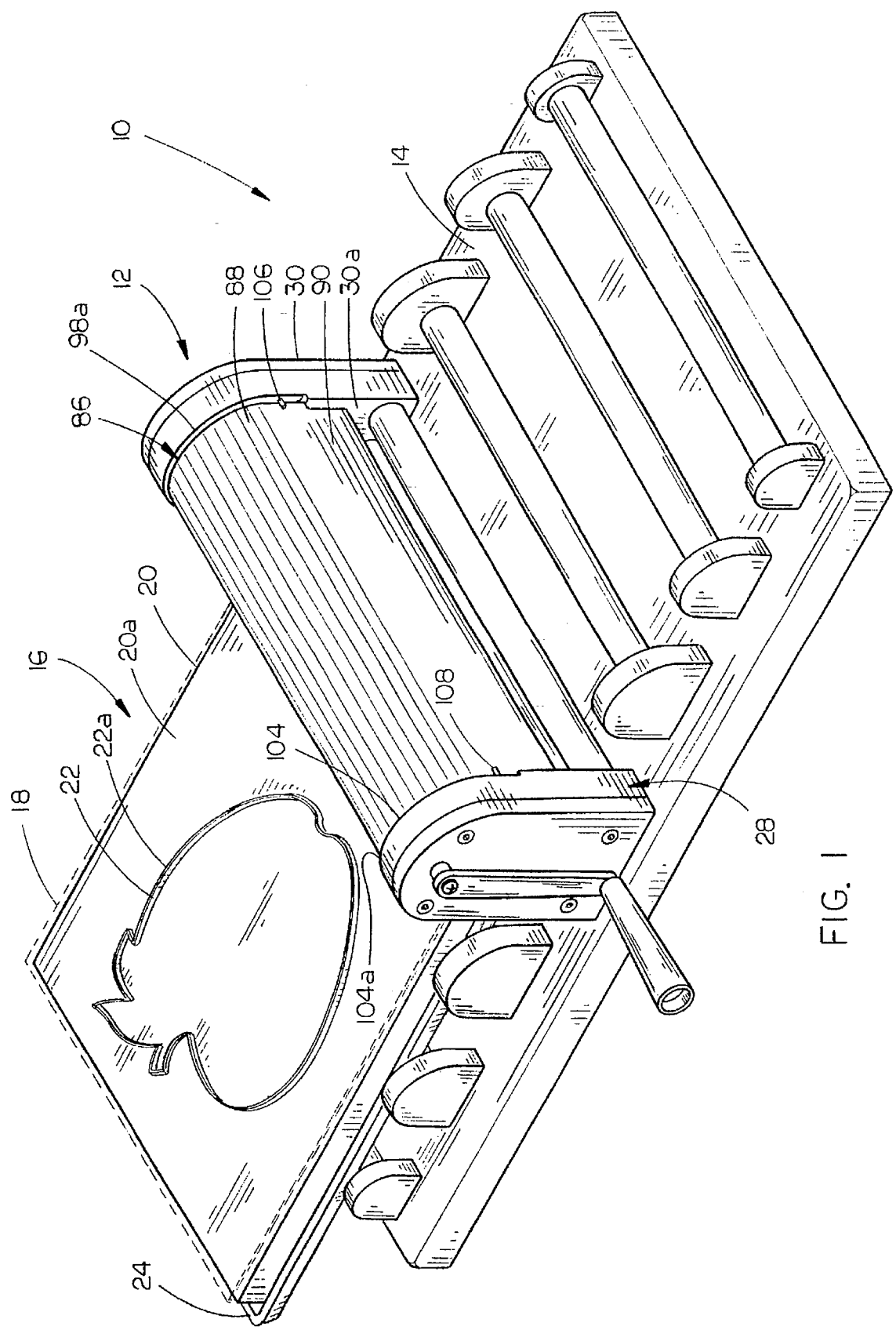
FIG. 1 is a perspective view of the roller die cutting machine of the present invention.

Referring now to the drawings, in which similar or corresponding parts are identified with the same reference numeral, and more particularly to FIG. 1, the roller cutting machine of the present invention is designated generally at 10 and includes a drive roller assembly 12 mounted generally centrally on a base 14, which receives a die assembly 16 for cutting shapes from various types of paper stock (shown in hidden lines at 18).

A conventional die assembly 16 includes a generally planar wood base 20 with a flat upper surface 20a, and a steel rule 22 projecting upwardly from the upper face 20a of base 20 and formed into a desired shape. As shown in FIG. 1, rule 22 is formed in the shape of an apple, and includes an upper cutting edge 22a lying within a single plane at a predetermined distance above the upper surface 20a of base 20. For convenience, a shallow tray 24 is provided to receive one or more die assemblies 16 and support them as they are passed through drive roller assembly 12.

Figure 2:
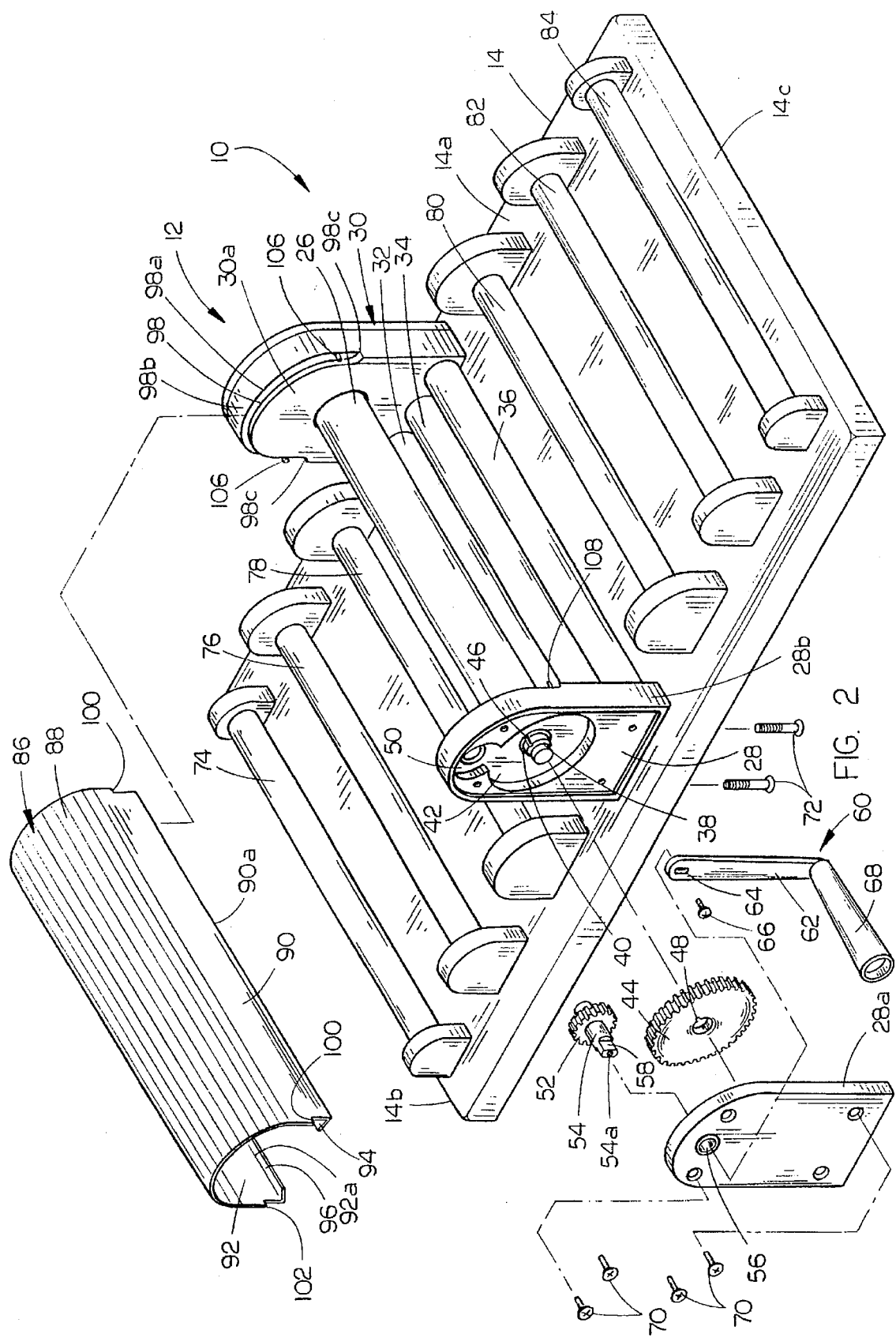
FIG. 2 is an exploded perspective view of the apparatus.

Referring now to FIG. 2, drive roller assembly 12 includes an elongated pressure roller 26 rotatably mounted between opposing forward and rearward stanchions 28 and 30, and spaced parallel to and above the upper surface 14a of base 14, generally transverse to the longitudinal axis of base 14. Three support rollers 32, 34 and 36 are rotatably mounted between forward and rearward stanchions 28 and 30, parallel with one another and with pressure roller 26, and spaced below pressure roller 26. Support rollers 32, 34 and 36 will support tray 24 and die assembly 16 (shown in FIG. 1) as die assembly 16 is drawn through drive roller assembly 12 under pressure roller 26, as described in more detail hereinbelow.

Stanchion 28 is formed from a pair of cooperating forward and rearward plates 28a and 28b respectively. Pressure roller 26 includes a central shaft 38 projecting through an aperture 40 in rearward plate 28b for rotatable support therein. A circular depression 42 formed in the forward face of rearward plates 28b is sized to receive a gear 44 therein concentric with and connected to shaft 38. A key 46 on shaft 38 co-acts with a slot 48 in gear 44 such that gear 44 rotates with shaft 38.

A smaller circular depression 50 is formed in the forward face of rearward plate 28b, spaced upwardly from shaft 38 and located such that a small drive gear 52 mounted within depression 50 will engage gear 44. Drive gear 52 includes a drive pin 54 affixed thereto and extending coaxially therethrough to serve as both a bearing and drive mechanism. A forward end 54a of drive pin 54 projects through an opening 56 in forward plate 28a, and has opposing flattened shoulders 58 formed thereon which project outwardly from a forward face of forward plate 28a. A crank 60 has an arm 62 with an elongated slot 64 formed in one end thereof which engages the projecting shoulders 58 of drive pin 54 to rotate drive pin 54 upon movement of arm 62. A screw 66 retains crank arm 62 on the forward end of drive pin 54, and a handle 68 projects forwardly from the second end of crank arm 62 so as to rotate drive pin 54, drive gear 52, gear 44, shaft 38, and thereby rotate pressure roller 26.

Forward plate 28a is attached to the forward face of rearward plate 28b by a plurality of screws 70, to retain gears 52 and 44 within depressions 50 and 42 respectively. A pair of screws 72 are inserted upwardly through base 14 and threaded into the bottom of rearward plate 28b, to retain stanchion 28 in position. A similar pair of screws are provided to retain rearward stanchion 30 in position on base 14. In this way, pressure roller 26 and/or support rollers 32, 34 and 36 may be removed and replaced by removing either forward or rearward stanchions 28 or 30.

A series of three idler rollers 74, 76 and 78 are rotatably mounted in parallel spaced apart fashion, with their axes parallel and co-planar with the longitudinal axes of support rollers 32, 34 and 36. As shown in FIG. 2, idler roller 74, 76 and 78 are generally uniformly spaced between drive roller assembly 12 and one side edge 14b of base 14. A second set of idler rollers 80, 82 and 84 are rotatably mounted to base 14 in uniformly spaced between pressure roller 26 and the opposing side edge 14c of base 14. Idler rollers 80, 82 and 84 are parallel, spaced apart, and have their rotational axes co-planar with the rotational axes of rollers 74, 76 and 78. In this way, idler rollers 74, 76 and 78 form a "table" upon which tray 24 (shown in FIG. 1) is supported prior to entry into drive roller assembly 12 and rollers 80, 82 and 84 form a second table for supporting tray 24 after exiting drive roller assembly 12.

A protective cover 86 is provided for drive roller assembly 12, to prevent the consumer from catching fingers in the drive roller assembly. Cover 86 is generally arch-shaped in cross-section, and includes a curved roof portion 88 and opposing generally vertical panels 90 and 92 extending downwardly from the side edges of roof 88. Each vertical panel 90 and 92 includes an inwardly directed lip 94 and 96, respectively, the juncture of lips 94 and 96 with vertical panels 90 and 92 forming lower edges 90a and 92a respectively.

The forward face 30a of rear stanchion 30 includes an arch-shaped depression 98 formed along its upper edge, having a vertical arch-shaped forward face 98a and a semi-cylindrical shoulder portion 98b, shoulder portion 98b shaped to receive the rearward end of roof portion 88 of cover 86 thereon. Vertical panels 90 and 92 have a length, as measured between the forward and rearward ends, slightly less than the length of roof portion 88, thereby forming forward and rearward shoulders 100 at the forward and rearward junctures of roof 88 with panel 90 and shoulders 102 at the junctures at panel 92 with roof 88. As shown in FIG. 1, the length of panels 90 and 92 is equal to the distance between the forward face 30a of rearward stanchion 30 and the rearward face of forward stanchion 28 for a snug fit therebetween. The length of roof portion 88 of cover 86 fits snugly between the forward face 98a of arch-shaped depression 98 (on rearward stanchion 30) and the vertical face 104a of a similar arch-shaped depression 104 on the upper end of the rearward face of forward stanchion 28.

Referring once again to FIG. 2, a pair of horizontally oriented pins 106 project from the vertical face 98a of depression 98 adjacent and spaced from the lower ends 98c of depression 98, pins 106 being spaced from depression shoulder 98b a distance substantially equal to the thickness of roof portion 88 of cover 86. In this way, cover 86 is snugly inserted between pins 106 and depression shoulder 98b, to retain the cover in position. A similar pair of pins 108 are provided on forward stanchion 28.

Figure 3:
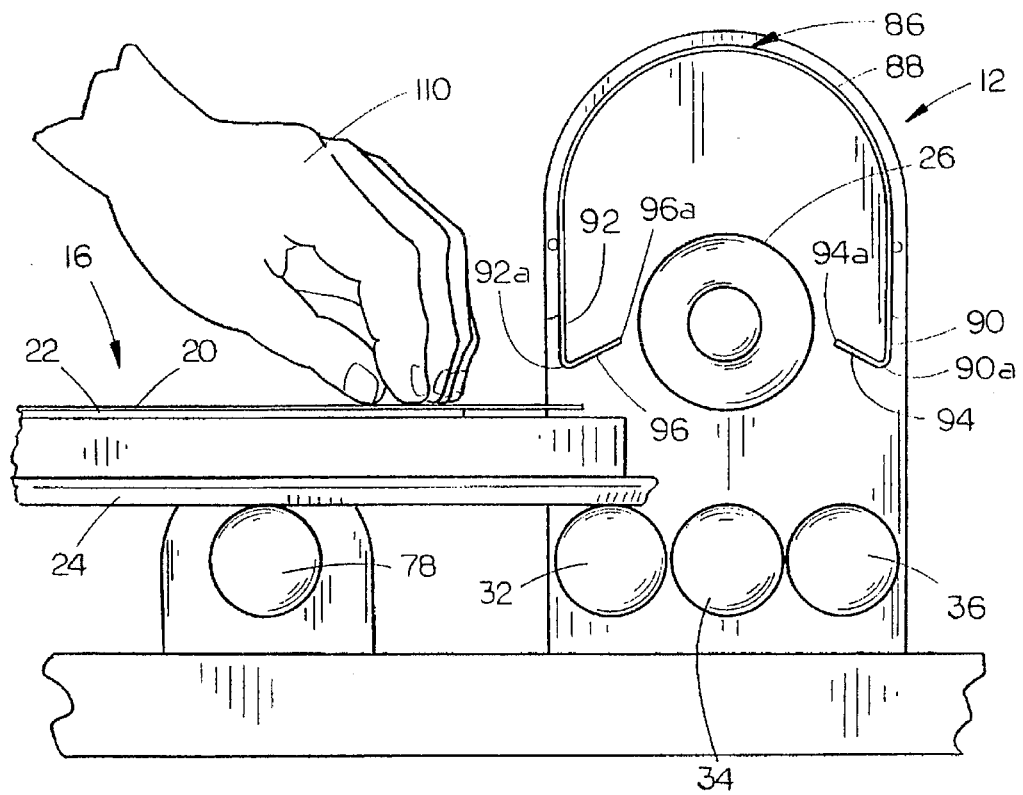
FIG. 3 is an enlarged vertical sectional view through the apparatus.
Figure 4:
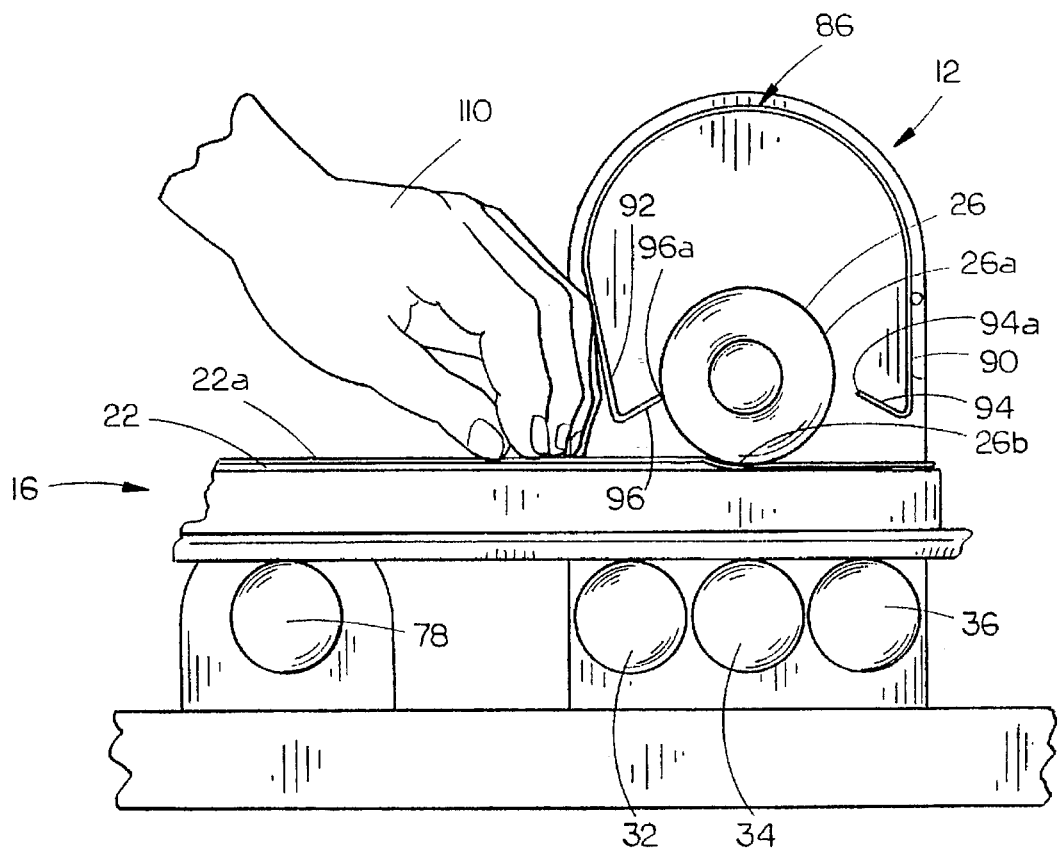
FIG. 4 is a view similar to FIG. 3, with the die moved into operable position under the pressure roller.

Referring now to FIGS. 3 and 4, operation of the cutting machine, and two of its safety features are shown in more detail. FIG. 3 shows die assembly 16 on tray 24 with a sheet of paper or other stock material 20 placed on top of rule 22, in preparation for cutting. Tray 24 is supported on idler rollers 74 (not shown), 76 (not shown), 78, and support roller 32. An operator will typically hold paper stock 20 in position with the hand 110 until the paper stock is gripped in drive roller assembly 12.

As shown in FIG. 4, pressure roller 26 preferably has an outer resilient compressible surface 26a with its lower crown 26b located above support rollers 32, 34 and 36 so as to engage the cutting edge 22a of rule 22, as die assembly 16 is drawn through drive roller assembly 12. Once rule 22 comes into contact with pressure roller 26, it can be seen that rotating crank handle 68 will cause pressure roller 26 to rotate and draw die assembly 16 between roller 26 and support rollers 32, 34 and 36. As die assembly 16 is drawn through drive roller assembly 12, the cutting edge 22a of die rule 22 cuts through the paper stock 20 and presses into the pressure roller surface 26a making cuts through the paper stock 20. As the die assembly 16 leaves drive roller assembly 12, it is supported on idler rollers 80, 82 and 84, as shown in FIG. 1.

Because of the proximity of hand 110 to the cutting operation occurring within drive roller assembly 12, safety features have been provided to alert the consumer to remove the hand from near the pressure roller contact with the die rule 22. First, the lower edges 90a and 92a of vertical panels 90 and 92 are located a distance above die assembly 16 to prevent the insertion of the fingers under cover 86. Preferably, this distance is one-quarter inch or less.

In addition, cover 86 is preferably formed of a stiff plastic material, but which is flexible. In addition, inwardly projecting lips 94 and 96 extend a distance and at an angle such that an inward edge 94a and 96a will be bent into frictional contact with the outer surface 26a if hand 110 is pressed against either vertical panel 90 or vertical panel 92, as shown in FIG. 4. The frictional contact of lip edge 96a (or lip edge 94a) with the hard rubber surface 26a of pressure roller 26 causes an audible sound to occur if the roller 26 continues to rotate, thereby alerting the operator that the hand 110 is too close to pressure roller 26, and endanger of being pinched or otherwise hurt.

Whereas the invention has been shown and described in connection with the preferred embodiment thereof, many modifications, substitutions and additions may be made which are within the intended broad scope of the appended claims.

I claim:

1. A roller die cutting machine, comprising:

a base having forward and rearward ends, opposing first and second side edges and upper and lower surfaces;

a drive roller assembly having an operable pressure roller, mounted on the upper surface of the base extending from the forward to the rearward ends thereof generally midway between the side edges, said drive roller assembly operable to rotate the pressure roller and draw a die assembly through the roller assembly to cut stock located on the die assembly;

said drive roller assembly including:

a pressure roller rotatably mounted between forward and rearward stanchions for rotation on a longitudinal axis; and a cover removably mounted between said stanchions and having first and second opposed vertical panels extending downwardly between said stanchions in generally vertical parallel planes, each of said first and second vertical panels having a generally horizontal lower edge extending between said stanchions a predetermined distance above said base upper surface;

a first table for supporting a die assembly, located between the drive roller assembly and the first side edge;

a second table for supporting a die assembly, located between the drive roller assembly and the second side edge;

drive means connected to the roller assembly for rotating the pressure roller to cut stock; and means on the drive roller assembly for producing an audible signal upon the approach of a human hand a predetermined distance from the pressure roller;

said means for producing an audible signal including:

said pressure roller having a cylindrical outer surface of a resilient compressible material;

a lip projecting from a lower vertical edge of the first vertical panel towards said pressure roller and spaced a predetermined distance from said roller outer surface;

a lip projecting from a lower vertical edge of the second vertical panel towards said pressure roller;

said first and second vertical panel lips having an inwardly projecting edge parallel to the outer surface of said pressure roller;

said cover vertical panels being formed of a resilient flexible material permitting bending of the vertical panels upon contact of a human hand with an exterior surface of the panel and permitting vibration of the lips upon contact with the pressure roller, such that the inward edge of each vertical panel lip frictionally contacts the outer surface of the pressure roller to produce said audible signal upon rotation of the pressure roller;

said pressure roller outer surface being formed with a material which vibrates the panel lips upon contact therewith to produce said audible signal.

2. The cutting machine of claim 1, wherein said first table includes a plurality of rollers rotatably mounted in spaced apart parallel relation, said first table rollers having co-planar upper crowns.

3. The cutting machine of claim 2, wherein the second table includes a plurality of rollers rotatably mounted in spaced apart parallel relation, said second table rollers having co-planar crowns which are co-planar with the first table roller crowns.

4. The cutting machine of claim 1, wherein said pressure roller includes a drive shaft rotatably mounted between forward and rearward stanchions, said drive shaft having a forward end projecting forwardly within a hollow chamber in said forward stanchion; and wherein said drive means includes:

a first gear mounted on the drive shaft within the chamber, for rotation therewith;

a drive gear rotatably mounted within the chamber, in engagement with the first gear;

said drive gear having a drive pin projecting through an opening in a forward face of the forward stanchion with one end projecting outwardly from the stanchion; and a crank mounted on the projecting end of the drive pin, operable to rotate the drive pin and thereby rotate the drive gear, first gear and pressure roller.

5. The cutting machine of claim 1, wherein each said panel lip is oriented generally perpendicularly to the outer surface of the pressure roller, to enhance vibration of the lip upon contact with the pressure roller.

* * * * *